US005949349A

United States Patent [19]

Farris et al.

[11] Patent Number: 5,949,349

[45] Date of Patent: Sep. 7, 1999

[54] CODE RESPONSIVE RADIO RECEIVER CAPABLE OF OPERATION WITH PLURAL TYPES OF CODE TRANSMITTERS

[75] Inventors: Bradford L. Farris, Chicago; James J. Fitzgibbon, Streamwood; Paul E. Wanis, Chicago, all of Ill.

[73] Assignee: The Chamberlain Group, Inc., Elmhurst, Ill.

[21] Appl. No.: 08/802,135

[22] Filed: Feb. 19, 1997

[51] Int. Cl.$^{6}$ .................................................. H04L 9/08

[52] U.S. Cl. ................................ 340/825.34; 340/825.3; 340/825.31; 340/825.69; 340/825.72; 340/825.22; 380/23; 380/21; 380/25; 380/28

[58] Field of Search ........................... 340/825.3, 825.34, 340/825.31, 825.69, 825.72, 825.22; 380/23, 25, 28, 21

[56] References Cited

U.S. PATENT DOCUMENTS

| | | | |
|---|---|---|---|
| 3,716,865 | 2/1973 | Willmott | 343/225 |
| 3,906,348 | 9/1975 | Willmott | 325/37 |
| 4,037,201 | 7/1977 | Willmott | 340/167 R |
| 4,064,404 | 12/1977 | Willmott et al. | 307/141.4 |
| 4,178,549 | 12/1979 | Ledenbach et al. | 325/38 R |
| 4,418,333 | 11/1983 | Schwarzbach et al. | 340/310 A |
| 4,454,509 | 6/1984 | Buennagel et al. | 340/825.69 |
| 4,529,980 | 7/1985 | Liotine et al. | 340/825.52 |
| 4,535,333 | 8/1985 | Twardowski | 340/825.69 |
| 4,623,887 | 11/1986 | Welles, II | 340/825.57 |
| 4,626,848 | 12/1986 | Ehlers | 340/825.57 |
| 4,633,247 | 12/1986 | Hegeler | 340/825.69 |
| 4,638,433 | 1/1987 | Schindler | 364/400 |
| 4,695,839 | 9/1987 | Barbu et al. | 340/825.06 |
| 4,703,359 | 10/1987 | Rumbolt et al. | 358/194.1 |
| 4,716,301 | 12/1987 | Willmott et al. | 307/115 |
| 4,750,118 | 6/1988 | Heitschel et al. | 364/400 |
| 4,754,255 | 6/1988 | Sanders et al. | 340/64 |
| 4,755,792 | 7/1988 | Pezzolo et al. | 364/538 |
| 4,802,114 | 1/1989 | Sogame | 364/900 |
| 4,807,052 | 2/1989 | Amano | 358/194.01 |
| 4,825,200 | 4/1989 | Evans et al. | 341/23 |

(List continued on next page.)

OTHER PUBLICATIONS

Keeloq NTQ105 Code Hopping Encoder; 8 page document; Trans Equatorial Technology, Inc., San Jose CA ©1993 Nanoteq Pty Ltd.

Keeloq NTQ115 Hopping Encoder; 8 page document; Trans Equatorial Technology, Inc., San Jose CA Jul. 1993.

Keeloq NTQ125D Code Hopping Encoder; 8 page document; Trans Equatorial Technology, Inc., San Jose CA ©1993 Nanoteq Pty Ltd.

Keeloq NTQ129 Code Hopping Encoder; 9 page document; Trans Equatorial Technology, Inc., San Jose CA ©1993 Nanoteq Pty Ltd.

MARCSTAR™ TRC 1300 and TRC 1315 Remote Control Transmitter/Receiver, Texas Instruments, Dallas, TX, dated Sep. 12, 1994.

"How to Program the HiSec™ Remote Keyless Entry Rolling Code Generator" #AN–961; Charles Watts, Oct. 1994.

MM57HS01 HiSec[198] Fixed and Rolling Code Decoder; National Semiconductor; Preliminary, Nov. 11, 1994.

"How to Design a HiSec™ Transmitter"; Charles Watts, et al., #AN–960; Oct., 1994.

*Primary Examiner*—Brian Zimmerman
*Assistant Examiner*—Yves Dalencourt
*Attorney, Agent, or Firm*—Fitch, Even, Tabin & Flannery

[57] ABSTRACT

A barrier movement system which is useful in provided barrier movement in environments where a first barrier such as a community gate is commonly controlled by a plurality of different actuators (transmitters) which actuators separately control other barriers such as household garage doors. The controller of the commonly controlled gate receives and contemporaneously analyzes codes in accordance with a plurality of different code format standards and at the same time analyzes the received code to determine which format is actually being received. In an embodiment only a fixed code portion of a rolling code sequence is used for actuation at the commonly controlled barrier.

9 Claims, 14 Drawing Sheets

U.S. PATENT DOCUMENTS

| | | | |
|---|---|---|---|
| 4,831,509 | 5/1989 | Jones et al. | 364/167.01 |
| 4,845,491 | 7/1989 | Fascenda et al. | 340/825.44 |
| 4,856,081 | 8/1989 | Smith | 455/151 |
| 4,905,279 | 2/1990 | Nishio | 380/9 |
| 4,914,696 | 4/1990 | Dudczak et al. | 380/21 |
| 4,922,168 | 5/1990 | Waggamon et al. | 318/286 |
| 4,988,992 | 1/1991 | Heitschel et al. | 340/825.69 |
| 5,193,210 | 3/1993 | Nicholas et al. | 455/38.1 |
| 5,278,907 | 1/1994 | Snyder et al. | 380/48 |
| 5,412,379 | 5/1995 | Waraksa et al. | 340/825.72 |
| 5,420,925 | 5/1995 | Michaels | 380/23 |
| 5,471,668 | 11/1995 | Soenen et al. | 455/352 |
| 5,635,913 | 6/1997 | Willmott et al. | 340/825.22 |
| 5,661,804 | 8/1997 | Dykema et al. | 380/25 |
| 5,686,904 | 11/1997 | Bruwer | 340/825.69 |

| | |
|---|---|
| *Fig. 6A* | *Fig. 6B* |

| | |
|---|---|
| | *Fig. 7A* |
| *Fig. 7C* | *Fig. 7B* |
| *Fig. 7E* | *Fig. 7D* |
| | *Fig. 7F* |

CODE RESPONSIVE RADIO RECEIVER CAPABLE OF OPERATION WITH PLURAL TYPES OF CODE TRANSMITTERS

BACKGROUND OF THE INVENTION

The present invention relates to remote actuation of equipment by means of transmitted security codes of a plurality of types.

Systems for the remote actuation of equipment, such as barrier movement equipment, are common today and are provided by many different manufacturers. Commonly, remotely controlled barrier movement systems include a wireless receiver which responds to a security code conveyed in accordance with a predetermined set of standards by moving a barrier when the conveyed code matches a code stored in the receiver. Should a transmitted code not be transmitted in accordance with the receiver's set of standards, the code will not be properly received and no barrier movement will be enabled.

One major manufacturer of garage door opening and other barrier movement systems presently uses at least three different sets of standards for conveying actuation codes. The three sets of standards have evolved for many reasons, such as improvements in technology and consumer demand for increasing security. One system uses synchronizing digits and 10 fixed code digits, another uses different synchronizing digits and 20 fixed code digits transmitted in two frames, and the third uses still different synchronizing digits, 20 "rolling code" digits, and 20 fixed code digits. The rolling code digits of the third system are not the same for each transmission but for improved security they change according to a preset algorithm known to both the transmitter and receiver.

As a result of consumer interest in automatic barrier movement convenience many systems of all of the above types, and those of other manufacturers, are in common use today. Also in common use today are barrier movement systems which are to be shared by many users. The front gate of a manufacturing plant or the front gate of a "gated" community are examples of shared usage of barrier movement systems. Today the front gate of such systems abides by a particular set of standards for code reception and each user is provided with a transmitter which transmits a code in accordance with that particular set of standards. Frequently, however, each user of a gated community also has a code transmitter for the operation of their own garage door or other security devices, causing inconvenience and even confusion on the part of the user.

One known automatic barrier movement actuation system has a receiver which can respond to and learn multiple types of codes. It operates, however, in only one code type at a time. That is, if the system is in the rolling code mode only other rolling codes of the same type can be used to actuate the system. If the system is in a fixed code mode, only other fixed code transmitters of the same type can be used. Thus, as with prior systems only one type of transmitter can be contemporaneously used. This inconvenience and lack of efficiency has given rise to a need for a barrier movement receiver and controller which can respond to different types of transmitted codes with appropriate security.

Additionally, any barrier actuation system must respond quickly to transmitted codes or the user will believe the system to not be responding to a fist transmission and will initiate a second transmission which may be interpreted by the receiver as another command. Studies have shown that for these human factors reasons the receiver should show the user some barrier movement within ½–1 second of the initial transmission. The discussed known barrier movement system has a learning mode in which it is capable of interpreting and learning an originally unknown code type. Such interpretation is done by arbitrarily assuming a type for an unknown received code and attempting to interpret the received code as if it is of the assumed type. If the interpretation fails, the receiver assumes another type of code and attempts to interpret the received code using the rules associated with the second code type. The interpretation continues using one assumed type after another until proper interpretation is achieved. This seriatim type of code interpretation has been found to require too much time to provide appropriate response to the user. Accordingly, a need exists for a more rapid method and apparatus for the response to multiple types of transmitted codes.

SUMMARY OF THE INVENTION

The problems of the art are solved in accordance with the present invention which receives and analyzes both fixed security code sequences and rolling code sequences and contemporaneously responds to both to operate equipment. The embodiment herein describes the operation of equipment primarily in terms of barrier movement, however, the operation of equipment may include other actions such as turning lights or other equipment on and off. With the present invention, users owning many types of security code transmitters using different code formats, including rolling codes, can share a barrier movement controller to open, for example, a gate. They can then also use their respective transmitters at separate sites, such as their homes, to exclusively operate their personal barrier movement systems.

As described in detail later herein, the shared receiver is cognizant of the various security code formats to which it will respond. As a security code sequence is received, the shared receiver analyzes each in accordance with all formats and code values are recovered and stored for each possible code format. When the code analyzer determines that an entire sequence has been received the analysis also identifies which recovered code type is valid and uses the valid recovered code. Such use includes storing the code in memory when the receiver is in a learn mode and comparing the recovered code with previously stored codes for possible barrier movement when the receiver is in an operate mode.

The shared receiver operates in response to both rolling code formats and fixed code formats. After learning both fixed and rolling codes, a memory of the receiver will contain fixed code sequences and sequences derived from rolling codes which are subject to being compared to new received codes. It should be mentioned that the rolling code format comprises both a rolling code portion which varies from transmission to transmission and a fixed code portion which remains constant for each transmission. When the shared receiver of the present invention receives a rolling code sequence it extracts the fixed code portion thereof for use. Accordingly, the fixed code portion will match subsequent transmission of the rolling code sequence regardless of changes in the rolling code portion. In the disclosed embodiment, this treatment of rolling codes permits security at the shared access point, which is equal to a 20 digit fixed code sequence, while permitting the increased security at the user's home or with other receivers which utilize the entire rolling code sequence.

In the preferred embodiment, the code word sequences all comprise sync characters at known locations within the code. One function performed by the shared receiver is to analyze the sync characters and their locations to identify the type of code word sequence being received. Further, the code word sequences may comprise different numbers of code digits. Since the shared receiver analyzes the received code in accordance with the formats of all possible codes to which it can respond, it can extract from the received code sequences the code digits and form a comparison value of the same number of code digits for all formats.

DETAILED DESCRIPTION OF PREFERRED EMBODIMENT

Figure 1:
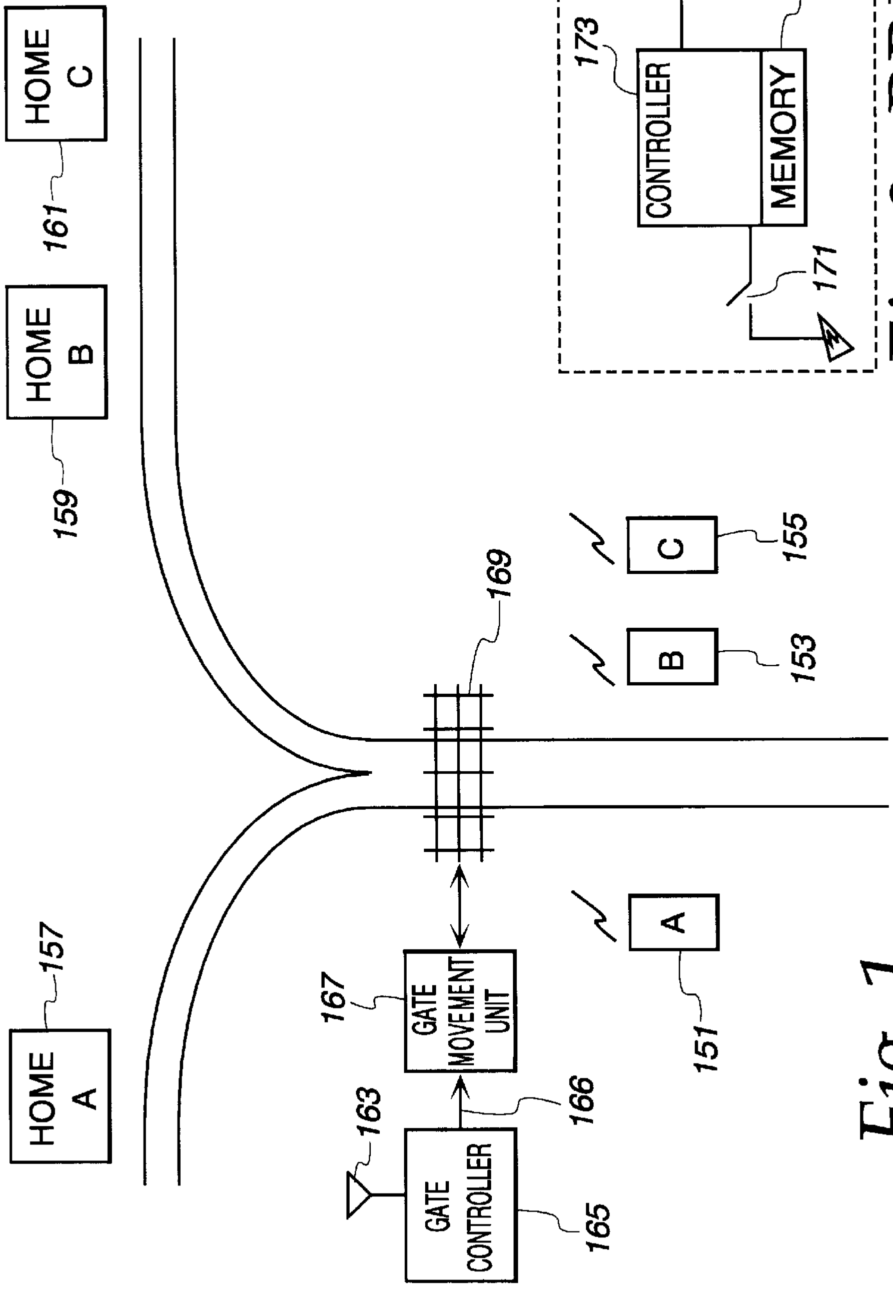
FIG. 1 is an overall view of a gated community with a gate controller.

The present invention may be used to operate many types of equipment such as turning lights on and off, however, it finds particular advantage, although not exclusive advantage, in systems in which a plurality of types of transmitters for sending actuation codes are used to move multiple barriers, with at least one barrier being a shared access barrier. FIG. 1 represents one such scenario in which multiple users use their individual transmitters 151, 153 and 155 to move a shared gate 169 while each transmitter is individually used at a single dwelling 157, 159 or 161 to open a garage door at that dwelling. In the example, the transmitters are labeled A, B and C, as are the dwellings where one transmitter is used to the exclusion of the others.

In the present embodiment, transmitter A (151) transmits a 10 digit fixed code sequence; transmitter B (153) transmits a 20 digit fixed code sequence and transmitter C (155) transmits a 40 digit rolling code sequence. It should be mentioned that the particular security codes discussed herein are representative of the types of security codes which can be used with the present invention. A gate controller 165 receives transmitted code sequences from all of the transmitters 151, 153 and 155 at an antenna 163 and responds to all received code sequences by enabling a gate movement unit 167 to open a gate 169. After opening gate 169 the transmitters can be moved to a home 157, 159 or 161 bearing the same letter designation and open the garage door at that home with the full amount of security of which the code type is capable. The particular garage door controller utilized at the homes is not described in detail herein as they have been previously described, for example in U.S. application Ser. No. 08/588,227 filed Jan. 18, 1996 and U.S. application Ser. No. 08/446,886 filed May 17, 1995. Similarly, the gate movement unit 167 and its physical movement of gate 169 is not described in detail herein.

Figure 2:
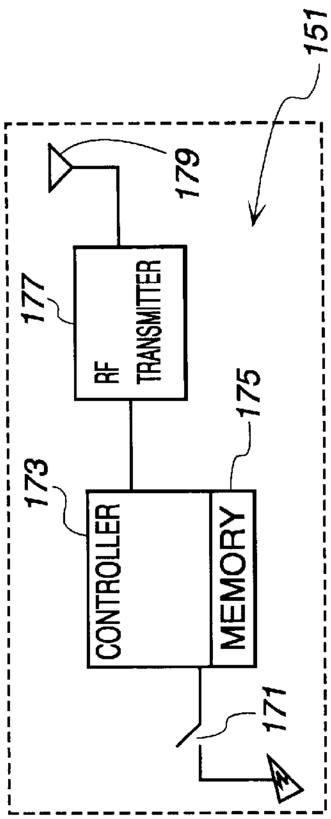
Fig. 2 PRIOR ART
FIG. 2 is a general block diagram of a security code transmitter.

FIG. 2 is a general block diagram of a security code transmitter, e.g. 151, of the type well known in the art. The general construction of all transmitters 151, 153 and 155 is the same except each includes a controller which causes transmission of a different type of code sequence. The transmitter 151 includes a power supply (not shown) and an enabling switch 171. When switch 171 is pressed a controller 173, which may be microprocessor controlled, reads a security code from a memory 175 or internal switch positions and transmits a leading sync digit and the read code to an RF transmitter 177 as a series of timed logic pulses. The RF transmitter 177 then transmits a modulated 390 MHz RF signal corresponding to the logical high and low portions of the code sent by controller 173.

Figures 3A, 3B, 3C:
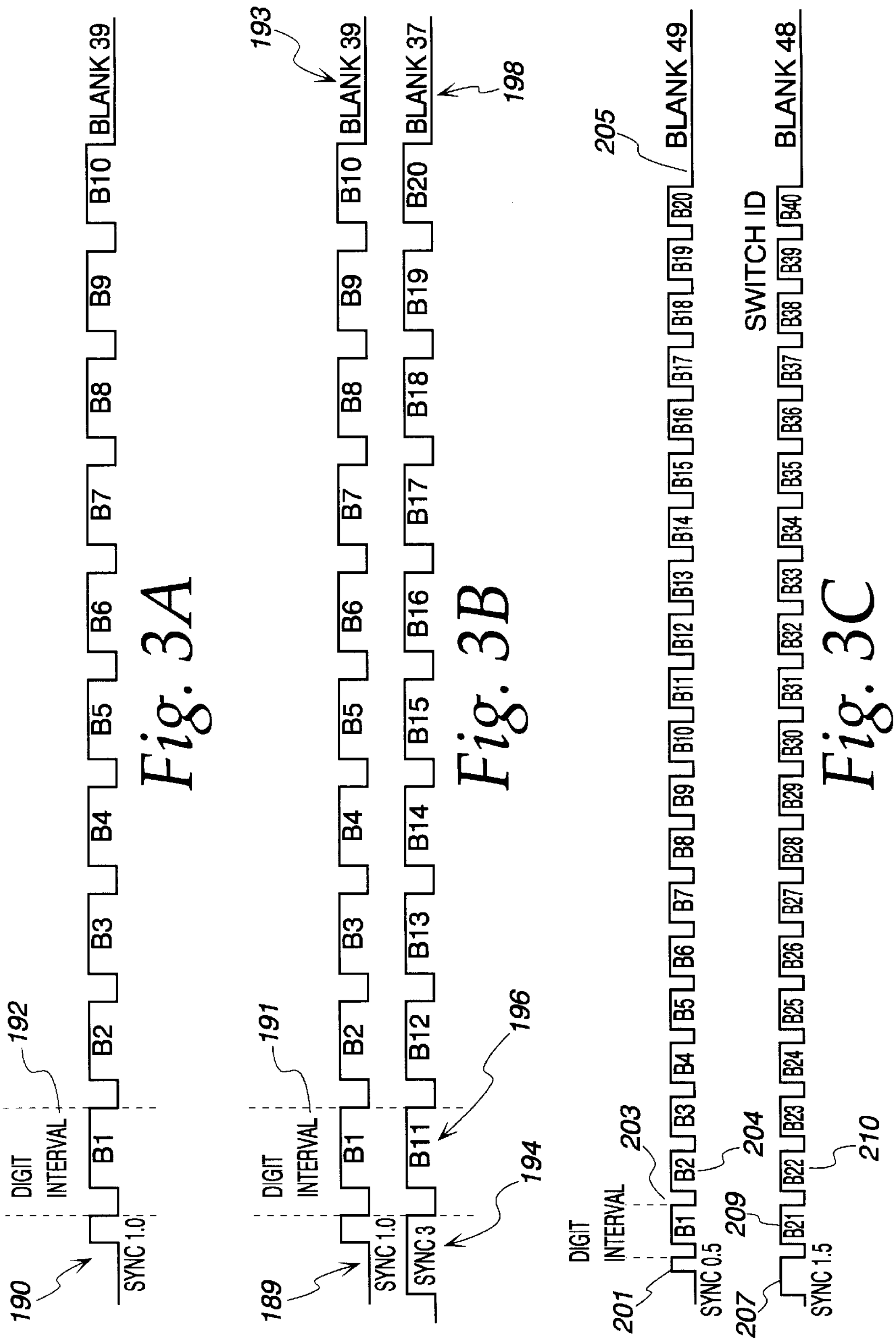
FIGS. 3A, 3B, and 3C are format diagrams showing a 10 digit fixed code, a 20 digit fixed code and a rolling code, respectively.

FIG. 3A represents the logic pulse sequence transmitted by a 10 digit fixed code transmitter 151 and is used to show the standards of transmission. The 10 digit fixed code sequence comprises an approximately 1 millisecond sync pulse 190, 10 digit intervals 192, and concludes with a blank time of approximately 39 milliseconds. During a normal transmission the controller 173 sends the code sequence to the RF transmitter several times so that multiple sequences are received by a receiver. The time periods of the various sync and code digits are controlled by the controller 173; however, given the extremes of usage it is possible that the actual time periods vary significantly from those shown.

Figure 4:
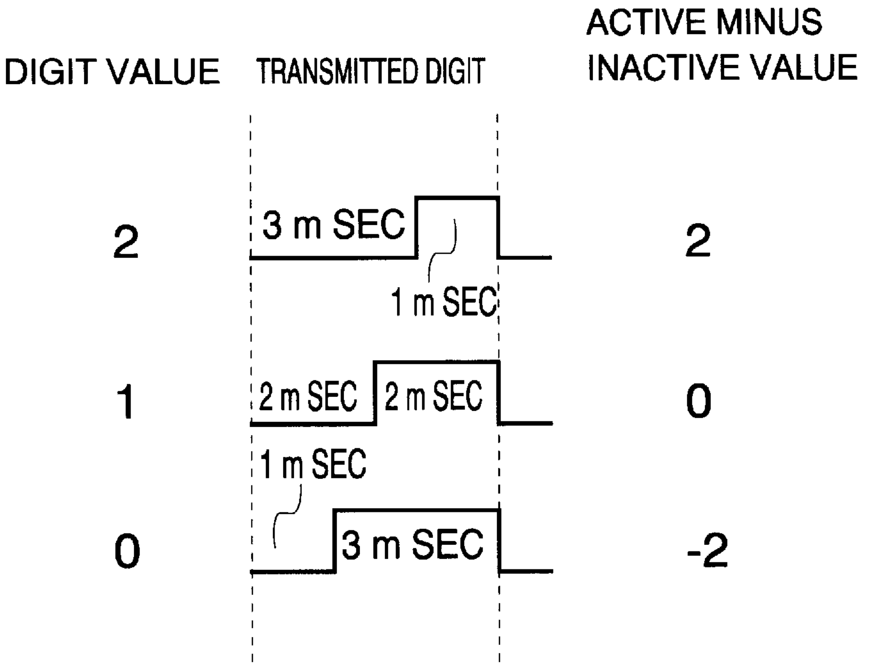
FIG. 4 is a digit interval chart showing the ideal timing for the digits of 10 and 20 digit fixed codes.

In FIG. 3A, the sync digit is shown as 190 and a representative 4 millisecond digit interval is shown as 192. The present system uses a three value coding system in which each digit interval may convey a 0, a 1 or a 2. Each of the digit intervals 192 of FIG. 3A represents a 2; however, FIG. 4 shows the timing which establishes the standards for other 10 digit fixed code digits. Each digit interval is approximately 4 milliseconds in length and consists of both logic low and logic high levels. A digit of value 2 (FIG. 4) is a logic low for approximately 3 milliseconds followed by an approximate 1 millisecond logic high. A digit value of 1 consists of a logic low for approximately 2 milliseconds and a logic high for approximately 2 milliseconds. A digit value of 0 consists of a logic low for approximately 1 millisecond followed by a logic high for approximately 3 milliseconds.

FIG. 3B shows a 20 digit fixed code of the type transmitted by a transmitter 153. The block diagram of such a transmitter is the same as that shown in FIG. 2. The 20 digit fixed code consists of two frames each comprising a sync digit, 10 code digits and an extended blank interval of 39 or 37 milliseconds. As with the 10 digit fixed code, a first 20 digit fixed code frame begins with a 1 millisecond sync digit 189 followed by ten 4 millisecond code digits. The value represented by the code digits, e.g. 191, is the same as the 10 digit fixed code values shown in FIG. 4. After the first frame of 10 code digits is transmitted, a blank interval 193 of 39 milliseconds is sent, followed by an approximately 3 millisecond sync digit 194. The 10 code digits, e.g. 196, following sync digit 194 are coded as shown in FIG. 4 and followed by a blank interval 198 of 37 milliseconds before a second sync pulse 189 is transmitted. A complete 20 digit code sequence comprises both the 10 code digits, e.g. 191, following the sync digit 189 and the 10 code digits 196 following the sync digit 194.

Figure 5:
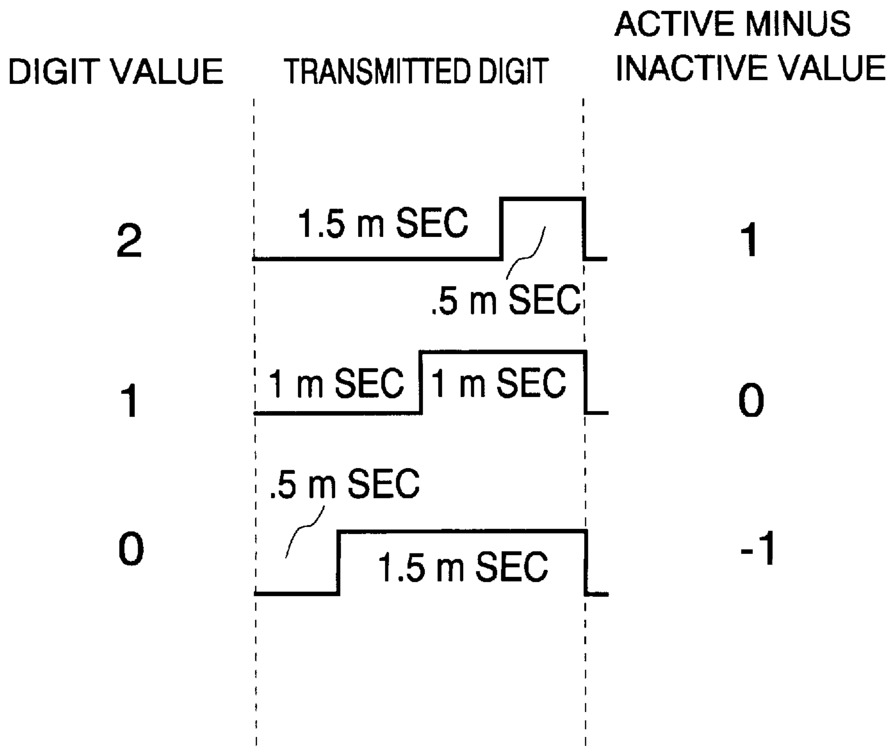
FIG. 5 is a digit interval chart showing the ideal timing for the digits of a rolling code.

FIG. 3C shows the two digit frames making up a 40 digit rolling code of the present embodiment. The 40 digit rolling code consists of a 20 digit rolling code portion which varies from transmission to transmission in accordance with an algorithm known to both transmitter and receiver and a 20 digit fixed code portion which remains the same for all transmissions by a given transmitter. The rolling code digits and fixed code digits are alternatively transmitted so that all odd numbered digits, e.g. 203 and 209, are fixed code digits and all even numbered digits, e.g. 204 and 210, are rolling code digits. Each frame of the rolling code begins with a sync digit, e.g. 201, followed by 20 code digits and ending with a blank interval of 24 or 24.5 milliseconds. As with the 10 digit and 20 digit fixed codes, the actual time intervals of code generation can vary significantly. A first rolling code frame begins with a sync pulse 201 of approximately 0.5 milliseconds followed by 20 digit intervals of approximately 2 milliseconds each. The rolling code digit values for transmission in the digit intervals are shown in FIG. 5. A digit value of 2 is represented by a logic low for approximately 1.5 milliseconds followed by a logic high for approximately 0.5 milliseconds. A digit value of 1 is represented by a logic low for approximately 1 millisecond, followed by a logic high for approximately 1 millisecond. A digit value of 0 is represented by a logic low for approximately 0.5 milliseconds, followed by a logic high for approximately 1.5 milliseconds. A second frame of digits begins with a 1.5 millisecond sync digit 207 which is followed by 20 code digits having the values shown in FIG. 5. The frame of a rolling code security code sequence as shown in FIG. 3C, is transmitted multiple times for each press of push button 171 (FIG. 2).

Figure 6A:
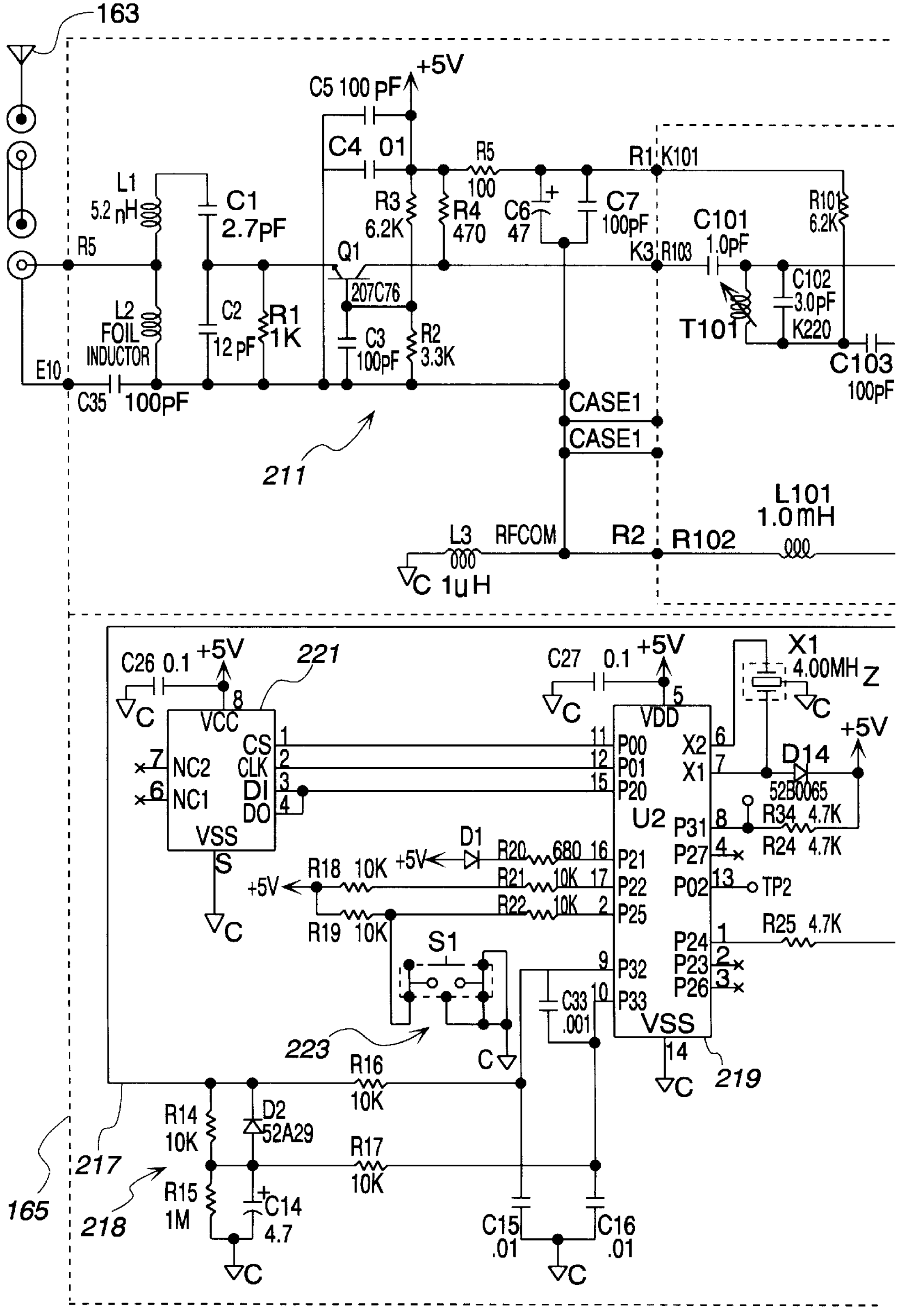
FIG. 6 is a circuit diagram of a security code receiver.
Figure 6B:
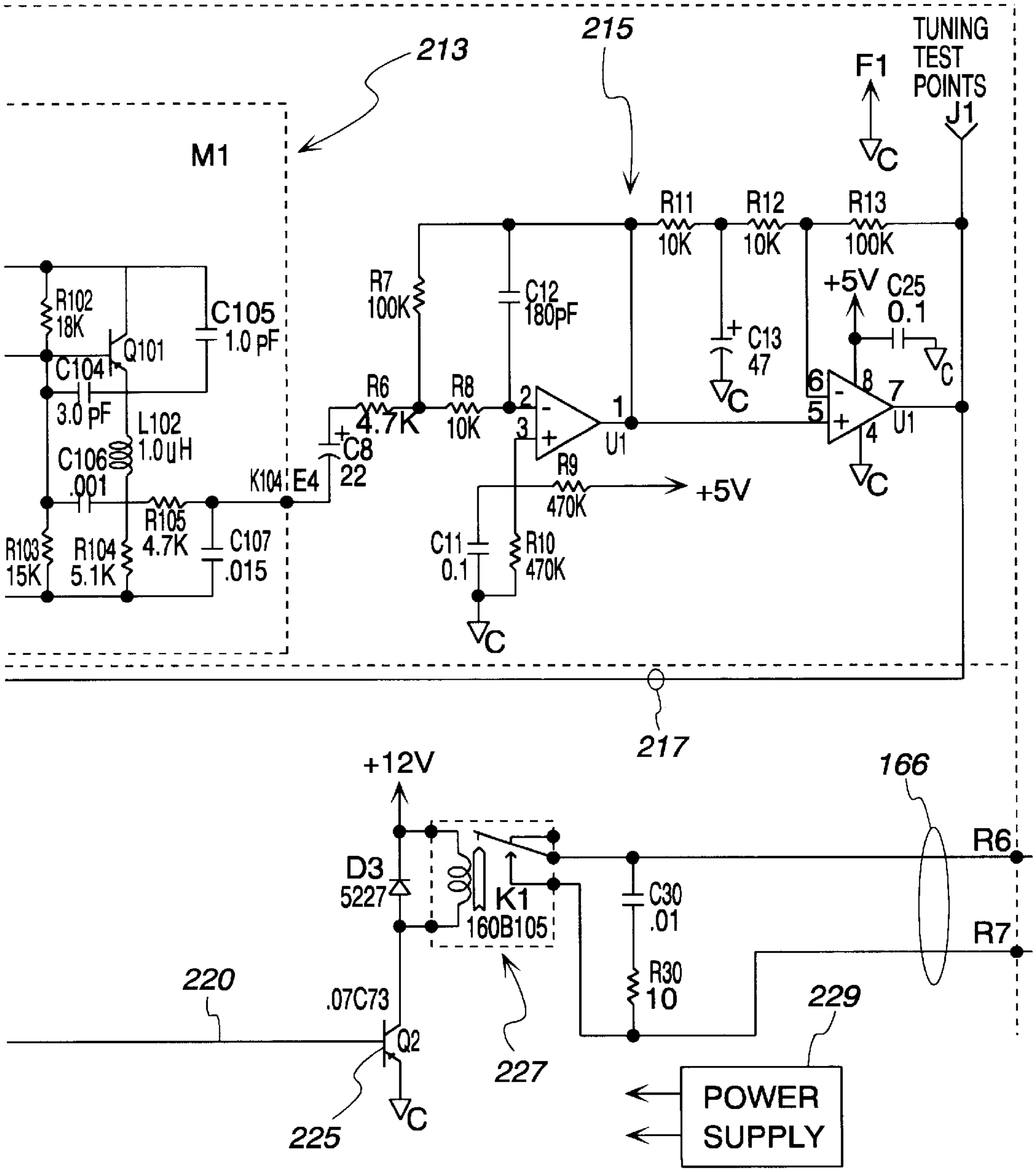

FIG. 6 illustrates the gate control 165 for use in the present embodiment. Gate control 165 is connected to antenna 163 to receive RF signals which are applied to an RP amplifier generally shown at 211. Thereafter, the amplified signals are applied to a 390 MHz demodulator 213 from which the demodulated output is applied to a baseband amplifier section generally denoted 215. The RF amplifier 211, demodulator 213 and baseband amplifier 215 are shown in detail but are not described in detail herein. The output of baseband amplifier 215 is connected to a controller 219 via a conductor 217 and a differential input circuit 218. The controller 219 may comprise a micro computer such as the Zilog Z86CO8 which includes a comparator (not shown) connected to input pins P32 and P33. The differential input created by differential input circuit 218 is connected to pins P32 and P33 of the controller 219 so that reasonably square input signals are present for analysis in the controller.

Gate controller 165 includes a nonvolatile memory 221 connected to the controller 219 and a program or learn switch 223. An output P24 of controller 219 is connected via a conductor 220 and a driver 225 to control a relay 227. The contacts of relay 227 are connected to the gate movement apparatus 167 via conductors 166 to control the movement of the gate 169. Although not described in detail herein, the gate controller 165 also includes a power supply circuit 229. The controller 219 operates in a learn mode in which received codes are interpreted and stored in non-volatile memory 221 or an operate mode in which received codes are interpreted and compared with codes previously stored in memory 221 for possible barrier movement. Whenever the learn mode switch is pressed, it is sensed by the controller 219 which marks a learn mode flag. If a code sequence is received while the learn mode flag is set, it will be learned. After a predetermined period of time, e.g. 30 seconds, the controller 219 resets the learn mode flag and any subsequently received code will be treated as a possible actuating code.

Figure 7A:
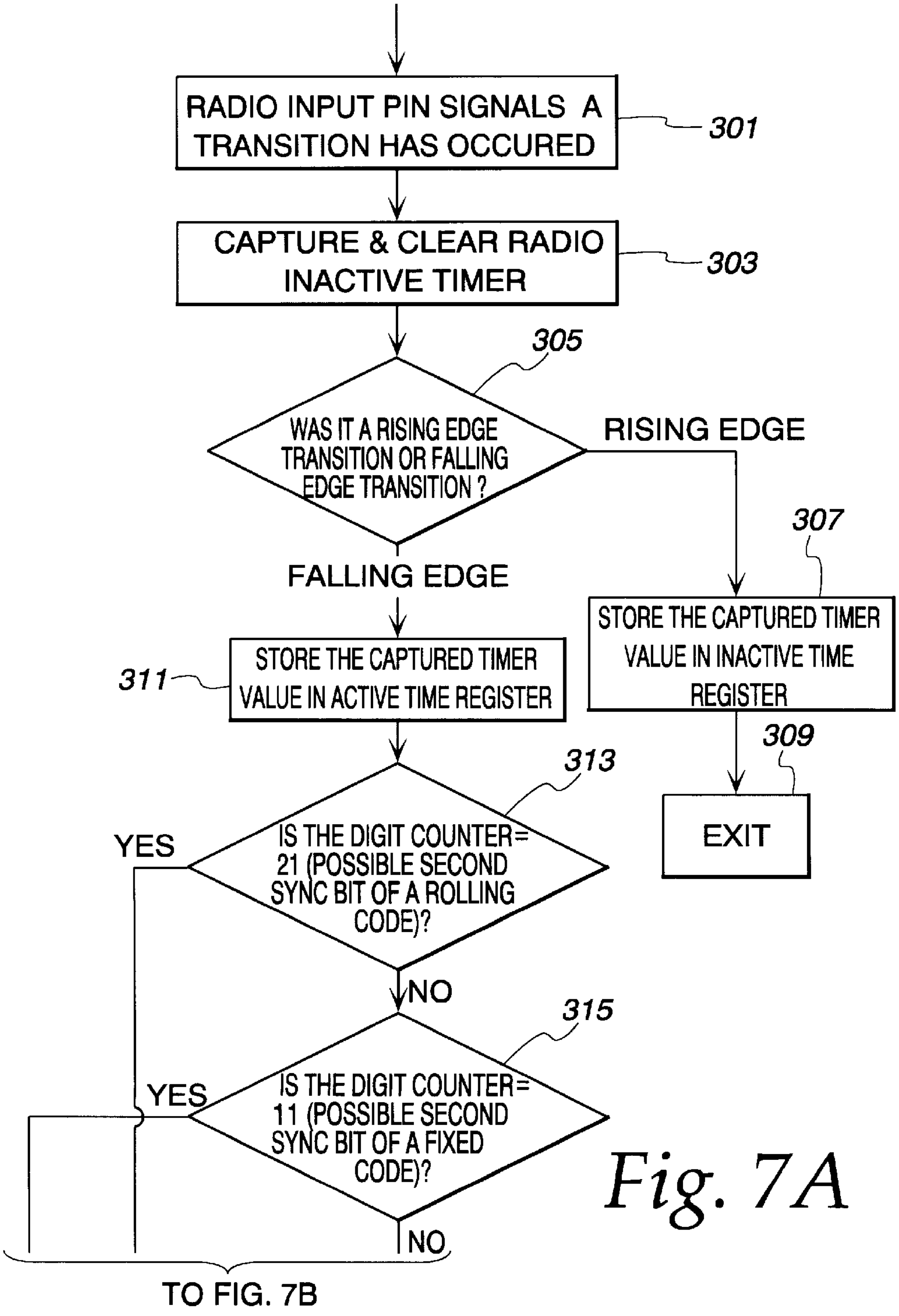
FIGS. 7A–7F are a flow diagram showing a method of received code interpretation.
Figure 7B:
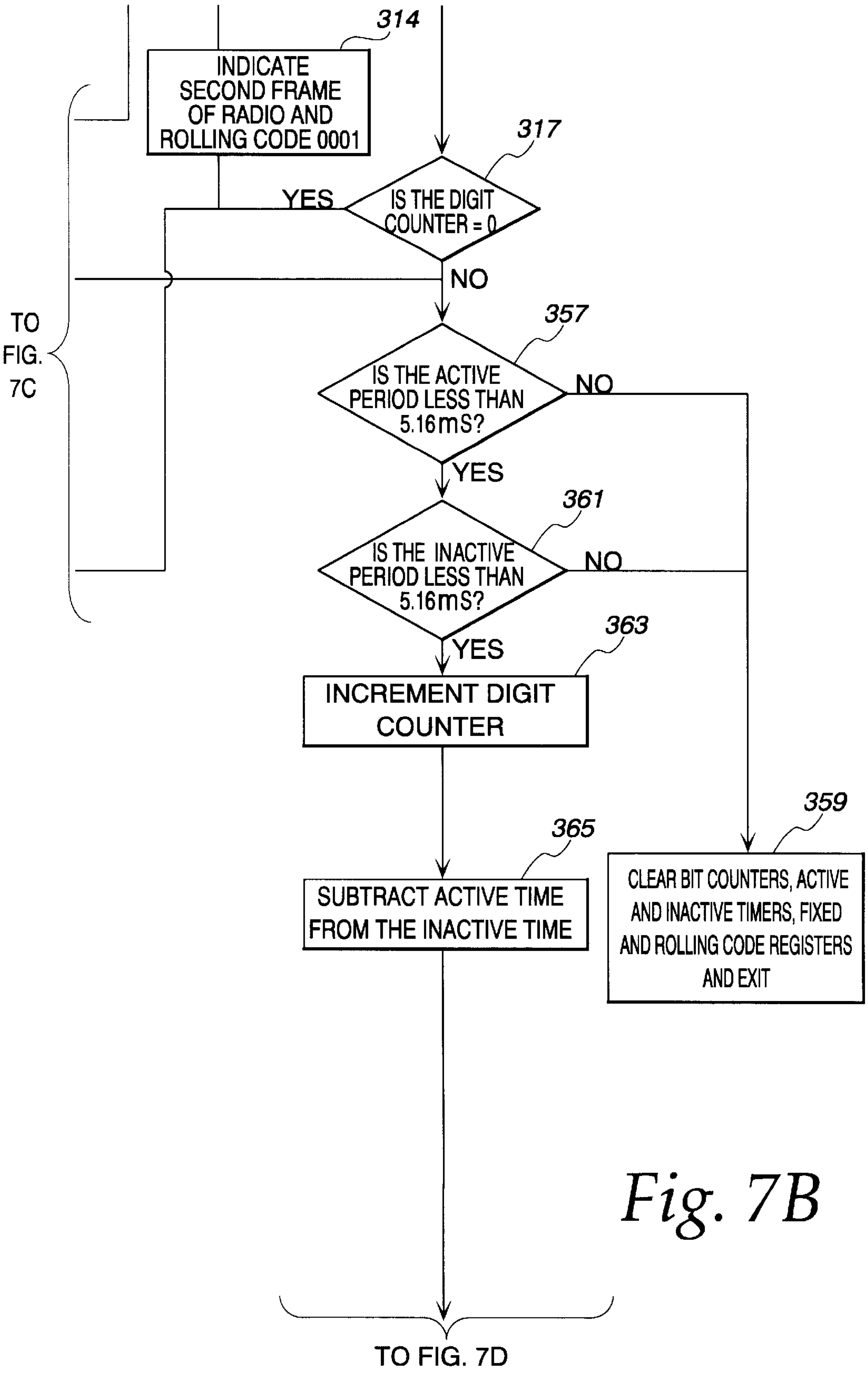
Figure 7C:
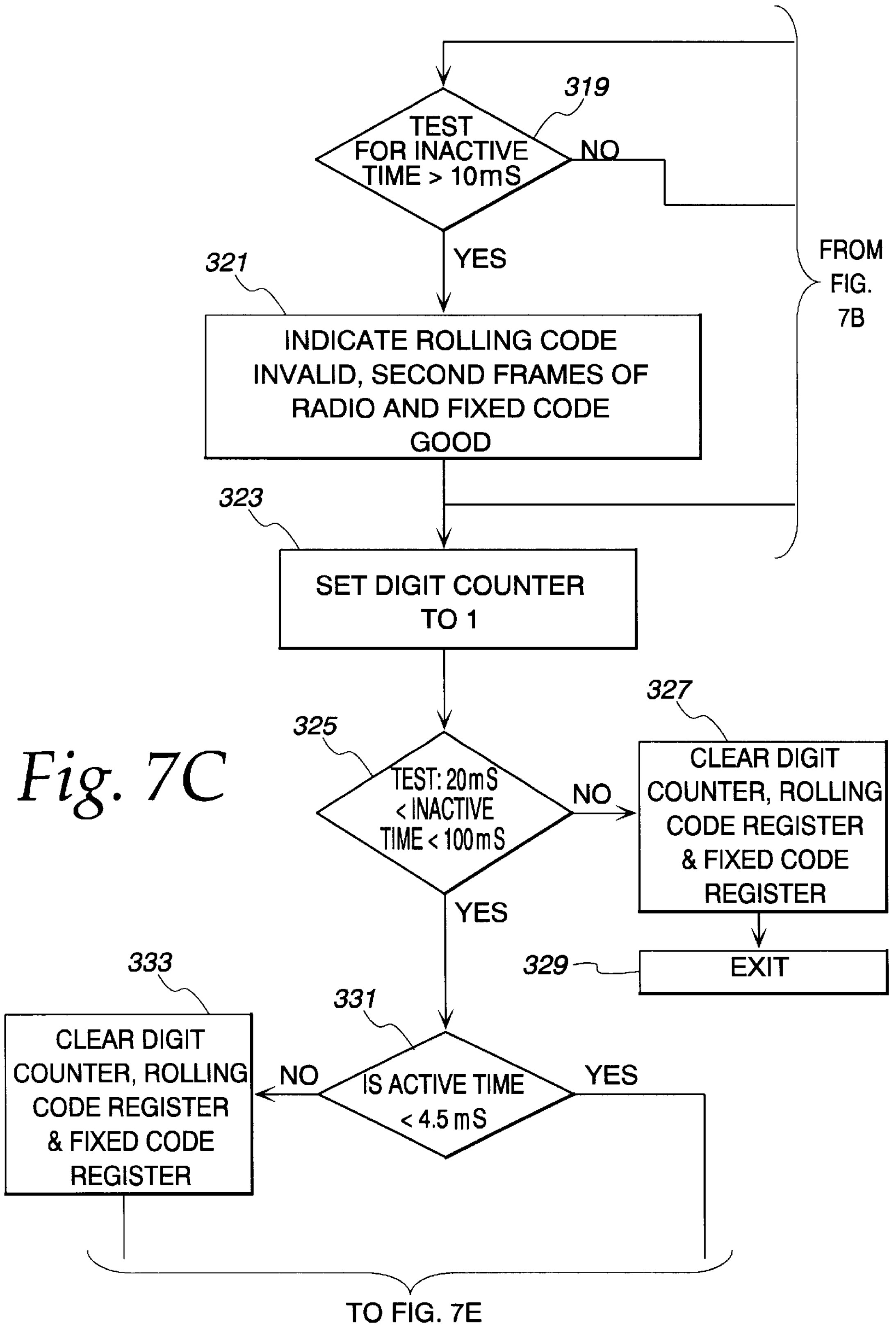
Figure 7D:
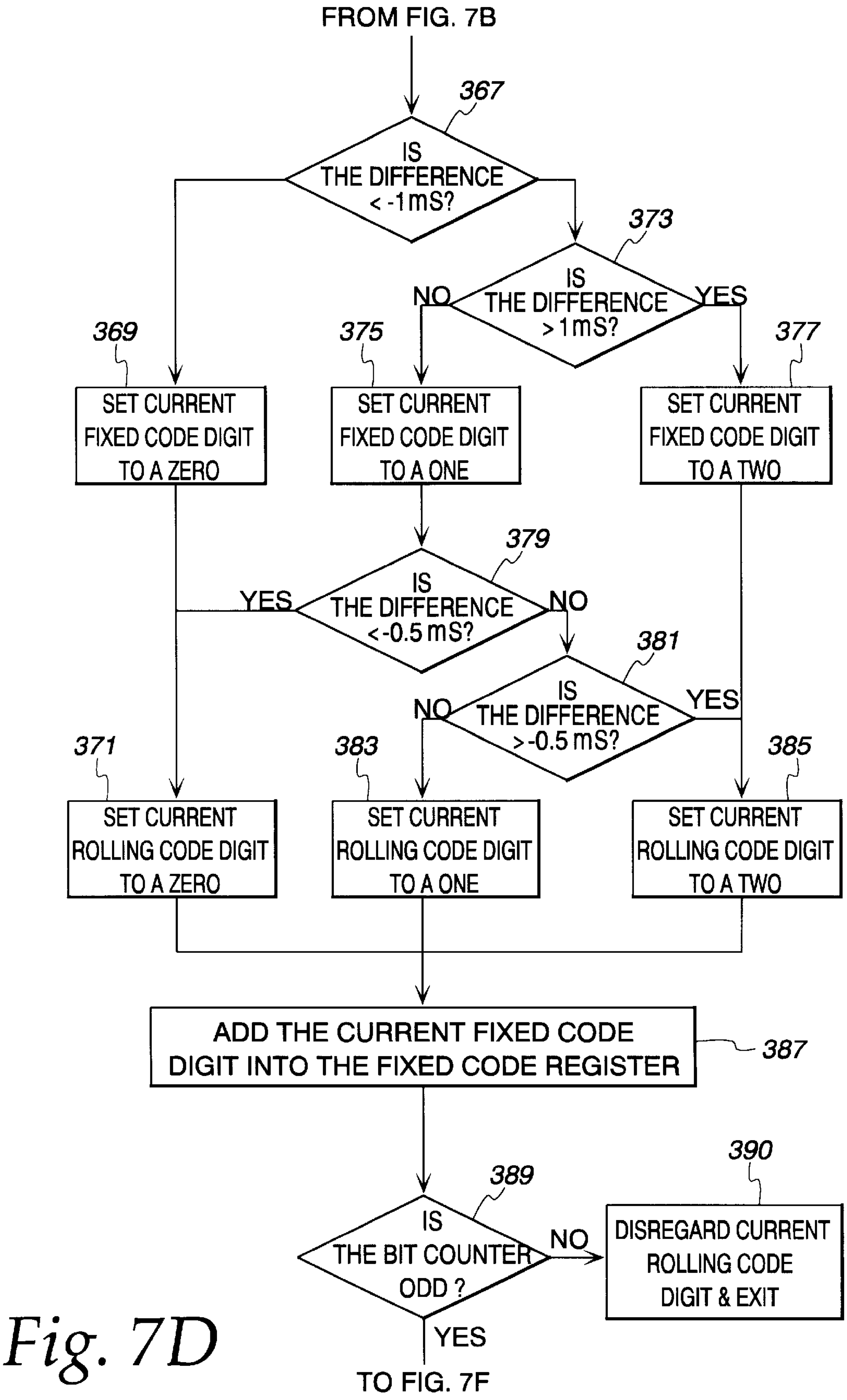
Figure 7E:
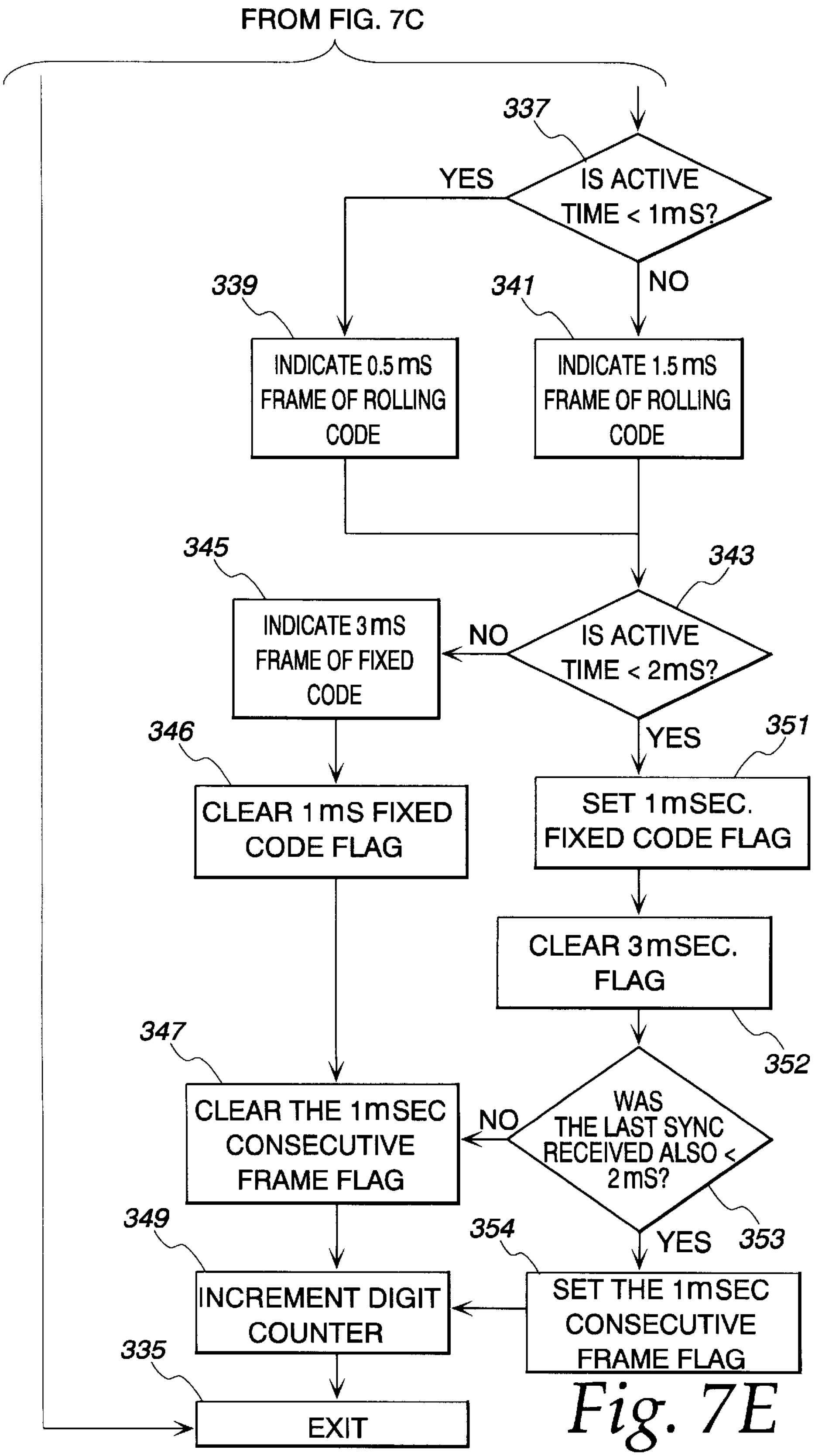
Figure 7F:
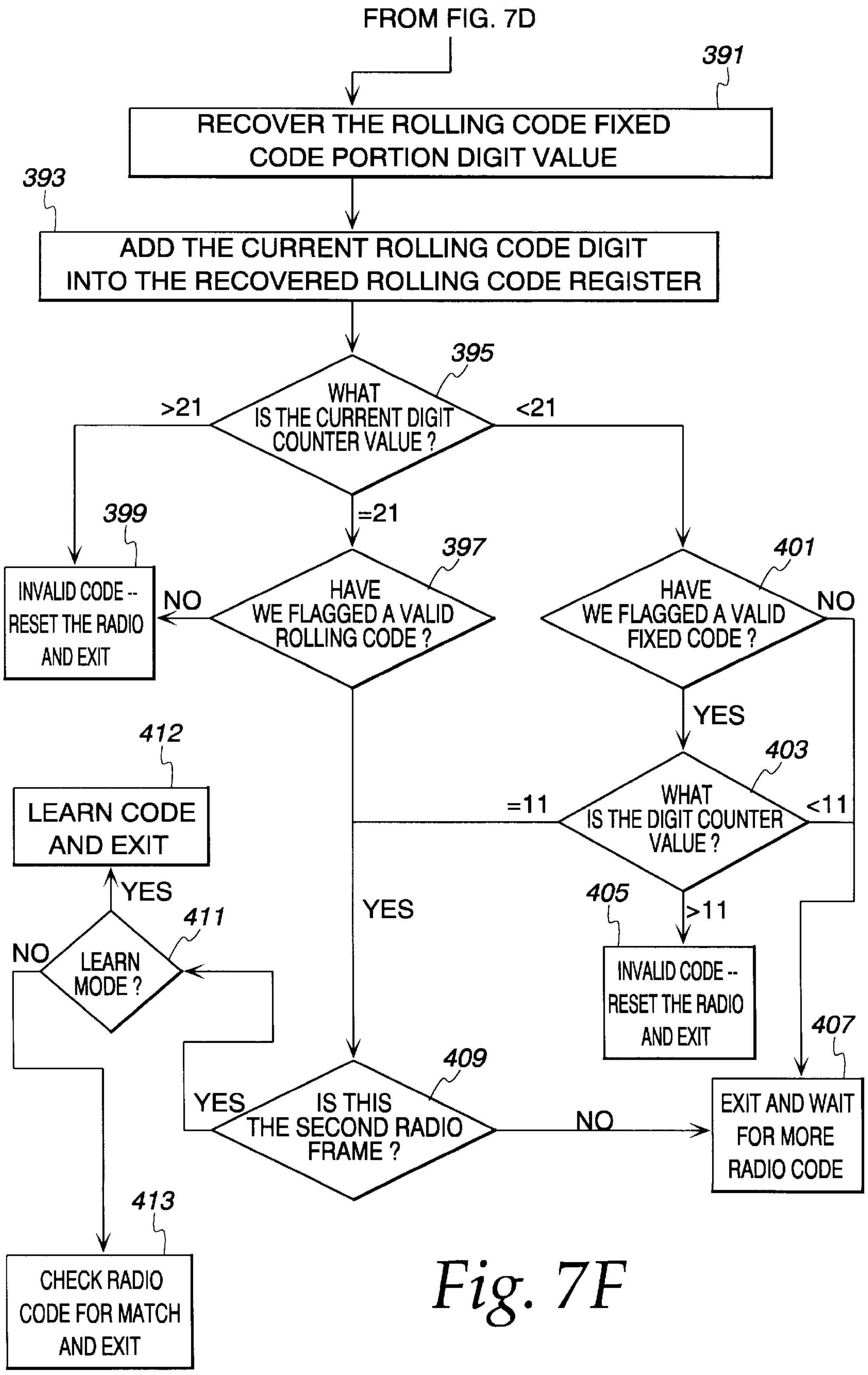
Figure 8:
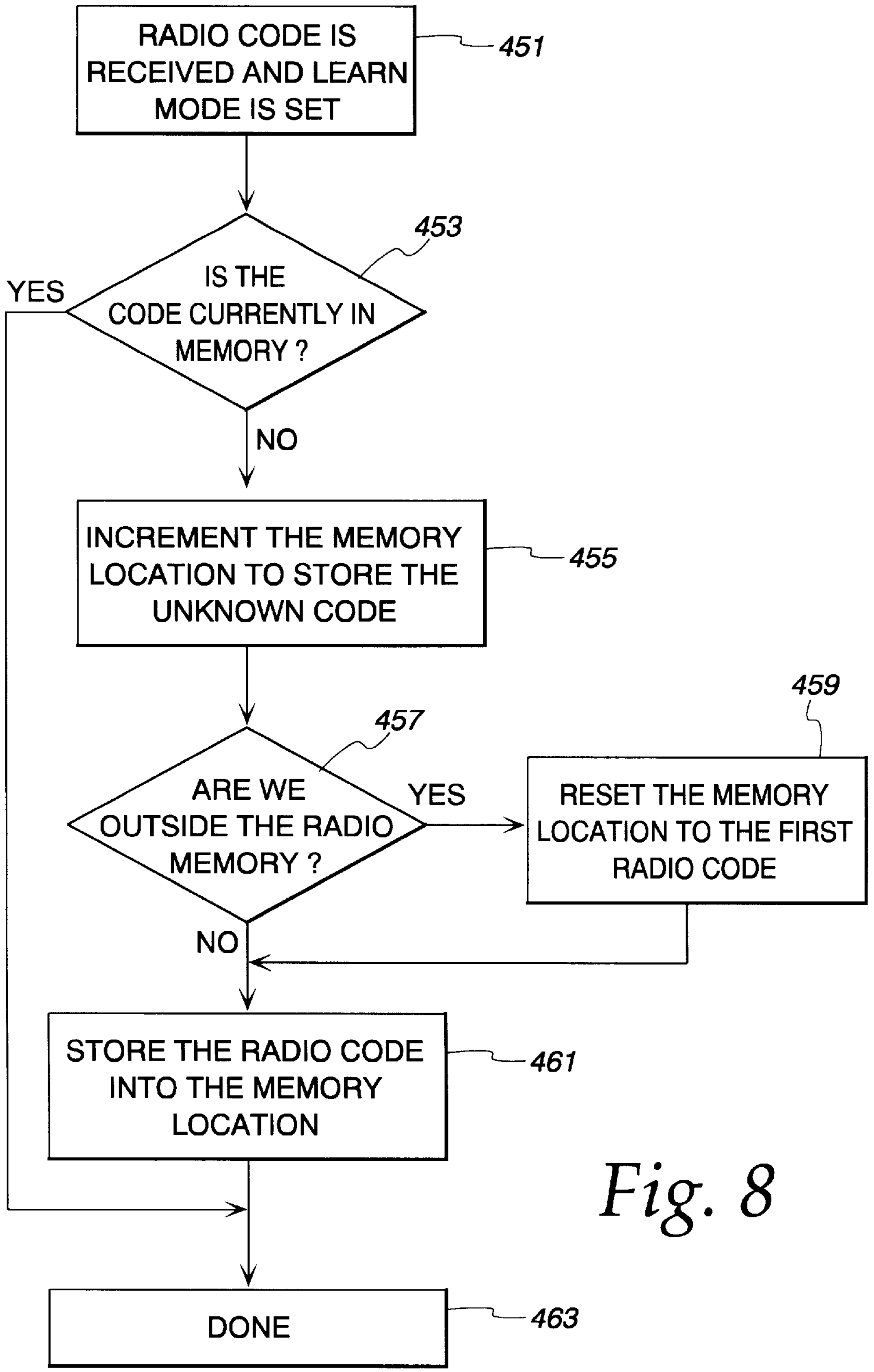
FIG. 8 is a flow diagram of a learning mode of operation.
Figure 9:
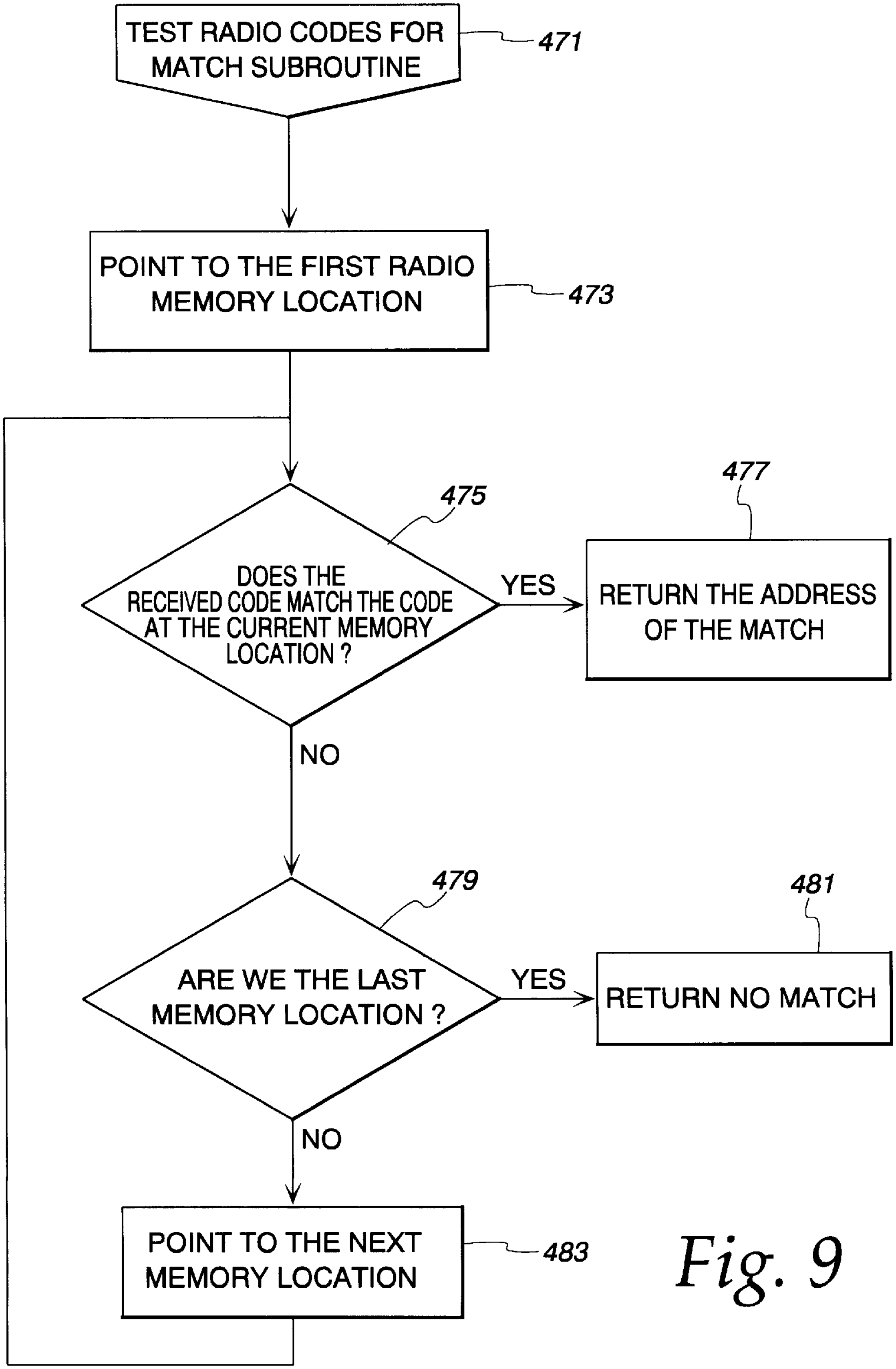
FIG. 9 is a flow diagram of an operate mode of operation.

Operating under the control of controller 219, gate controller 165 is capable of contemporaneously storing security codes for gate movement of all three of the code types discussed above, for learning all such code types and for moving the gate in response to all code types. FIGS. 7A–F, 8 and 9 are flow diagrams showing the control process of receiving, identifying, learning and responding to the multiple code types of the present embodiment. FIGS. 7A–F show the process of receiving code sequences, identifying their type and recording the transmitted digits. FIGS. 8 and 9 show the use of the code receiving of FIGS. 7A–F in learning new codes and gate movement, respectively.

Controller 219 regularly scans the inputs to pins P32 and P33 which receive the baseband of logic levels from the baseband amplifier 215 to detect and time both low to high and high to low transitions. When a transition is detected, the analysis process of FIG. 7 begins at a step 301 and proceeds to a step 303 where the value of a radio inactive timer is captured and then cleared. Next, the flow proceeds to a step 304 where the transition is analyzed to identify whether the transition is a rising edge or a falling edge. When a rising edge is detected the time since the last falling edge is captured and stored in an inactive time register in a step 307. A step 309 is then performed to exit the routine and await another input signal transition.

When step 305 identifies that a falling edge has occurred, flow proceeds to step 311 in which a timer value representing the time since the last rising edge is captured and stored in an active time register. A series of decision blocks 313, 315 and 317 is then entered to identify if the digit being received is a possible sync digit. For purposes of the present example we assume that a first digit, i.e. a sync digit, is being received so the bit counter is equal to 0. Thus the flow proceeds from block 313 to block 315, then to 317 (FIG. 7B). Flow proceeds from block 317 to a block 323 (FIG. 7C) because the bit counter equals 0. In block 323 the digit counter is set to 1, which indicates a possible sync digit, and flow proceeds to a test step 325. The value stored in the inactive time register is tested to determine whether it falls between 20 and 100 milliseconds in step 325 to identify if the inactive time is within the normal standards for transmitted code sequence blank times. When the inactive time is not within the normal range, flow proceeds to step 327 where the digit counter, rolling code register and fixed code register are all cleared and an exit is performed in a block 329.

When step 325 shows that the inactive time is consistent with a blanking interval, flow proceeds to a block 331 where the value in the active time register is compared to 4.5 milliseconds. Since no code sequence type includes an active signal of 4.5 milliseconds or greater, a no answer in block 331 leads to 333 where the digit counter, the fixed code register and the rolling register are all cleared. Flow then proceeds to block 335 where an exit occurs to wait for another input transition. When the inactive time is less than 4.5 milliseconds, which is consistent with a received digit, flow continues from block 331 to block 337 (FIG. 7E) where the active time is compared with 1 millisecond. When block 337 determines that the active time is less than 1 millisecond, a block 339 is performed to indicate that a 0.5 milliseconds rolling code frame may be being received. Such indication consists of storing a logic 1 in a 0.5 milliseconds frame rolling code bit position of a control register (not shown) in controller 219. Alternatively, when step 337 determines that the active time is not less than 1 millisecond a step 341 is performed to indicate, by marking a register bit position, that possibly a 1.5 millisecond frame of rolling code is being received. After either block 339 and 341, a block 343 is performed in which the active time value is compared with 2 milliseconds. When the active time value is not less than 2 milliseconds, a register bit is set in step 345 to indicate that a 3 millisecond frame of 20 digit fixed code is possibly being received. Flow then proceeds to a block 346 to clear a flag set to indicate a 1 millisecond frame and on to block 347 to clear a flag indicating that two consecutive 1 millisecond sync digits have been received. Since the 10 digit fixed code does not contain a sync digit in excess of 1 millisecond (or 2 milliseconds at the most out of range) any performance of step 345 is followed by clearing the 1 millisecond flag and the consecutive 1 millisecond frame flag. After the performance of step 347, the digit counter is incremented in step 349 and the process is exited in step 335. When step 343 identifies that the active time is less than 2 milliseconds, step 351 is performed to set a 1 millisecond frame of fixed code flag and flow proceeds to a block 352 to clear a flag possibly set previously to indicate a 3 millisecond frame. Thereafter, flow proceeds to block 353 to identify whether the last sync digit received was also less than 2 milliseconds. When it is, a step 354 is performed to set the two-consecutive 1 millisecond frame flag and flow returns to step 349 to increment the digit counter and an exit is performed. Alternatively, when the last sync digit was not less than 2 milliseconds, the 1 millisecond frame flag is cleared in step 347.

After exiting at step 335 the controller 219 awaits subsequent transitions of the input signals to begin the analysis again at step 303. As shown in FIGS. 3A–C, all sync digits will occur at digit counter values of 0, 11 or 21, which is the reason that steps 313, 315 and 317 are performed to enter the sync digit evaluation flow of FIGS. 7C and 7E. When a falling edge is detected in block 305 and the digit counter is not equal to 0, 11 or 21, a code digit is expected and flow proceeds to block 357 were the active time is compared to 5.16 milliseconds. When the active time period is not less than 5.16 milliseconds the digit is considered invalid and flow proceeds to step 359 where all system counters and timers are cleared and an exit is performed. When the active time is less than 5.16 milliseconds, the flow proceeds to a block 361 to determine if the inactive time is less than 5.16 milliseconds. When the inactive time is not less than 5.16 milliseconds, the code digit is invalid and flow proceeds to block 359. When the active and inactive timers are within the limits set by steps 357 and 361, flow proceeds to step 363 where the digit counter is incremented. After step 363, the active time is subtracted from the inactive time in step 365 to provide a basis for code digit evaluation. FIGS. 4 and 5 show the active time minus inactive time values for fixed code digits and rolling code digits, respectively. In subsequent step 367, the difference is compared to −1 millisecond and when the difference is less than −1 millisecond a value called the current fixed code digit is set to a 0 in step 369 and a value called the current rolling code digit is also set to 0 in step 371. It will be noticed that at this point of the evaluation of code digits neither fixed or rolling codes have been excluded and the digit values are recorded for both types of codes.

When the difference is identified in step 367 as not being less than −1 millisecond, flow proceeds to step 373 were the difference is compared with 1 millisecond. When the difference is determined to be greater than 1 millisecond a step 377 is performed to set the current fixed code digit to a two and to set the current rolling code value to a 2 in step 385. When the step 373 determines that the difference is not greater than 1 millisecond the current fixed code value is set to one and a step 379 is performed to compare the difference to −0.5 millisecond. Should step 379 determine that the difference is less than −0.5 millisecond the current rolling code value is set to zero (step 371). Also, by the operation of steps 379 and a comparison step 381 the current rolling code digit is set to 1 in step 383 when the difference lies between −0.5 millisecond and 0.5 millisecond and sets the current rolling code digit to two in step 385 when the difference is between 1 millisecond and 0.5 millisecond. The digit evaluation of steps 367–387 (FIG. 7D) clearly illustrates that digit values are broadly interpreted to account for possible transmitter and receiving inaccuracies as well as to operate in the face of transmission noise. Further, the digits are being contemporaneously accumulated as received as both rolling code and fixed code digits. At the conclusion of the analysis of two received frames of digits one will be excluded and the other used, but at this time both are accumulated.

After the current digit value is set for both fixed and rolling codes, a step 387 is performed to include the current fixed digit in a fixed code register at a digit position determined by the digit counter. In the case of rolling codes the present receiver uses only the fixed code portion and the fixed code portion digits are transmitted in the odd digit positions of the rolling code sequence. Thus, a step 389 is performed to identify if the present code digit is even and, if so, to exclude the current rolling code digit in step 390. Rolling codes are used in transmitted code arrangements because they provide increased security on fixed codes. Some rolling code systems further improve security by encoding the fixed code portion of a rolling code in response to the rolling code digits. Step 391 is performed on the fixed code portion of a rolling code to remove any additional encoding of the fixed code digit and the flow proceeds to a step 393 to insert the result into the rolling code register at a position identified by the digit counter.

When the fixed portion of the rolling code and the fixed code are stored in their respective registers, a step 395 is performed to compare the digit counter value to 21. When the digit counter exceeds 21 the code is invalid and a step 399 is performed to reset all parameters and exit. When the digit counter is less than 21 a step 401 is performed to determine if the flag bit indicating a valid fixed code has been set. If not set, an exit is performed in step 407 to await more digits. When step 401 determines that a valid fixed code has been flagged, the digit counter is compared to 11 in a step 403. When the digit counter is less than 11 the exit of step 407 is performed. When step 403 identifies that the digit counter exceeds 11, the code is invalid and all process parameters are reset in step 405. Lastly, when step 403 determines that the digit counter equals 11, a step 409 is performed to determine if the second radio from flag bit is set. If it is not set, the exit step 407 is performed. When step 395 determines that the current digit counter equals 21, a step 397 is performed to identify if a valid rolling code flag has been set. If not, the code is invalid and a parameter clearing and exit are executed. If the valid rolling code flag is set, flow proceeds from step 397 to step 409. When step 409 determines that the second frame has been received, a step 411 is performed to see if the learn mode switch 223 has been pressed. When the learn mode switch 223 has been pressed, the learn mode of FIG. 8 is entered to store the newly received code into memory 221. Alternatively, when the learn switch 223 has not been pressed, flow proceeds to block 413 (shown in FIG. 9) to check for a match with previously stored codes and possible barrier movement. The flow diagrams of FIGS. 8 and 9 are discussed later herein.

As a first sync digit and subsequent code digits are successfully received block 315 will eventually be entered with the digit counter set to digit 11, which will cause flow to proceed to block 319. A digit counter of 11 could be a second sync digit of a 10 or 20 digit fixed code or a regular code digit of a rolling code frame. Block 319 compares the inactive time value with 10 milliseconds, and when the inactive time is less than 10 milliseconds flow proceeds to block 357 for evaluation as a regular code digit. When the inactive time exceeds 10 milliseconds the digit is assumed to be a sync digit, since it follows a long blank internal, and flow proceeds to block 321 where rolling code is marked invalid since digit 11 of a rolling code is never a sync character. Further, block 321 marks the second word of radio code and fixed code flags because a sync code is expected at digit count 11 for the 10 and 20 bit fixed codes. After step 321, the sync evaluation steps 323–335 are executed as described above.

When a rolling code is being received block 313 will eventually be entered with a digit counter value of 21. Flow then proceeds from block 313 to block 314 where the second frame flag is set as is a rolling code good flag. Flow then proceeds to block 323 where sync digit evaluation is performed as described above.

It is not possible to know prior to receipt whether a rolling code or a fixed code will be received. It is also not possible to know prior to receipt whether, in a 20 digit fixed code, the 1 milliseconds or the 3 milliseconds code will be first received and similarly, with a rolling code, whether the 0.5 millisecond or the 1.5 milliseconds frame will be first received. As the sync digit of each frame is received and evaluated in steps 337–353 (FIG. 7E), flags representing the possible sync codes are set and cleared in steps 339, 341, 345, 347 and 353. These flags are used to identify the type of the immediately following frames of 10 digit fixed code, or 10 digit fixed code portions of rolling codes.

Figure 10:
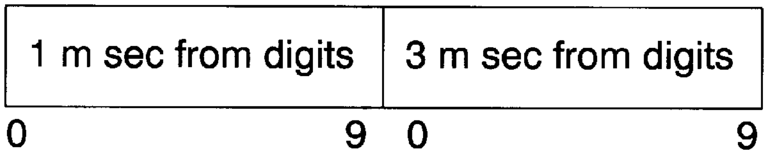
FIGS. 10–12 represent registers into which recovered security codes are inserted for 20 digit fixed codes, 10 digit fixed codes and rolling codes.
Figure 11:
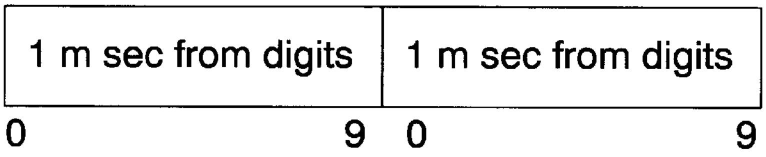

The fixed code register and the recovered rolling code register into which the recovered code digits are written are each 20 digits in length as is the recovered rolling code register. As current fixed codes are inserted into the fixed code register (step 387), they are inserted so that the code digits of a 1 millisecond frame occupy the 10 leftmost digit positions of the fixed code register, as is shown in FIG. 10. When a 3 milliseconds frame of fixed code digits are received, they are added to the 10 rightmost positions of the 20 digit fixed code register. Lastly, when the second frame of fixed code is also a 1 millisecond frame, it is added to the rightmost 10 bit position of the 20 digit fixed code register as shown in FIG. 11.

Figure 12:
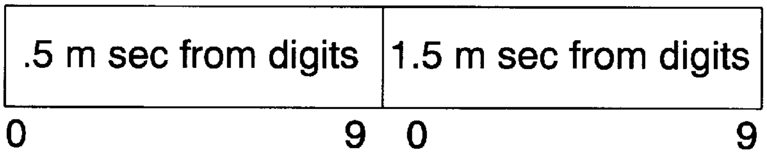

The recovered rolling code register, which stores the fixed code portion of a rolling code, also comprises 20 digit positions. The code digits recovered in step 391 when the 0.5 milliseconds frame flag is set, are written in step 393 into the leftmost 10 digit positions (FIG. 12); and the code digits recovered while the 1.5 milliseconds flag is set are written into the rightmost digit positions.

FIG. 8 shows the processes performed when the learn mode switch is pressed and a code sequence is received. The process begins with step 451 in which the learn mode is set and a 20 bit code register has been filled with received code digits of any type. In a step 453, the contents of memory 221 are checked to determine if the received code is already in memory, and if so, the process is completed in step 463. When the received code is not in memory, a pointer to the last filled memory location is incremented in step 455; and a block 457 is entered to determine if a predetermined limit on code memory locations has been exceeded. The system, for example, may permit only 64 unique 20 digit codes. When the limit is not exceeded, the new code is stored in memory at the location pointed to by the pointer. Alternatively, when the pointer indicates that the memory limit has been exceeded, the pointer is reset to the first memory location in step 459 and the code previously stored in the first location is overwritten with the new code in step 461. After writing the memory, the process is completed in step 463.

FIG. 9 shows the subroutine performed in block 413 when a code sequence has been received in the operate mode. The subroutine proceeds from a block 471 to a block 473 where a memory pointer is set to the first location storing a security code. The security code pointed to is then compared with the received code, and if a match is discovered, the address of the match is returned to the barrier moment function of controller 219, which sends an enabling signal on conductor 220 to drive relay 227 via transistor 225. When no match is detected, the address is checked in block 479 to identify if the last memory location has been accessed. When the last memory location has been accessed, a block 481 is entered to return a no match indication and controller 219 will not enable relay 227. When block 479 discovers that the last memory location has not yet been read, the memory pointer is incremented in block 475. The loop formed by blocks 475, 479 and 483 will continue until either a match or a no match signal is returned to the barrier control procedure.

As previously mentioned, the described embodiments relate to the movement of barriers such as garage doors or gates. The invention may also be used to activate other types of equipment such as lights. For example, the receiver of the present invention could be employed to turn lights on and off in a common area while the individual transmitters could be employed with other receivers to turn specific other lights on and off.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. In an equipment actuation system, a method of responding to sequences of code digits received in a plurality of code word sequence formats including a rolling code format, each format being defined by a code word format standard, comprising the steps of:

receiving and detecting the digits of a transmitted code word sequence in a sequence;

analyzing each detected digit for consistency with each of a plurality of code word format standards digit by digit as the digits are received and recovering code digits as a result of analysis;

registering the recovered digits in a plurality of registers each associated with a different code word sequence format;

identifying the format of the received code word sequence in response to the analyzing step; and storing a value in the receiver derived from a received code word sequence registered in a register associated with the identified format.

2. A method in accordance with claim 1 wherein each code word format comprises at least one synchronizing character definition and the method comprises excluding at least one of the plurality of code word formats during the analyzing step by analyzing the at least one synchronizing character.

3. A method in accordance with claim 1 wherein at least one of the code word formats relates to a rolling code comprising a rolling portion and a fixed portion and the method comprises storing a value derived from only the fixed code portion when a rolling code format is identified.

4. In an equipment actuation system, a method comprising:

receiving a fixed security code sequence during a learning mode, and storing the received fixed code sequence in a first security code memory location;

receiving a rolling code security sequence during a learning mode, and storing in a second security code memory location a value derived from the received rolling code security sequence;

activating equipment in response to the receipt of a fixed code sequence while in an operate mode; and activating the same equipment in response to the receipt of a rolling code sequence while in an operate mode.

5. In an equipment actuation system, a method in accordance with claim 4 comprising:

receiving a rolling code security sequence comprising a fixed code portion while in the learning mode; and storing in second security code memory location a value derived only from the fixed code portion of the received rolling code security sequence.

6. In an equipment actuation system, a method in accordance with claim 5 comprising extracting the fixed code portion from a received rolling code sequence.

7. An equipment actuation system comprising:

a memory storing a fixed security code sequence and a value derived from a rolling security code sequence;

a receiver for receiving transmitted fixed security code sequences and rolling security code sequences;

apparatus responsive to a received fixed security code sequence for comparing the received fixed security code sequence with both the fixed security code sequence and the value derived from a rolling security code sequence stored in the memory; and means responsive to the apparatus for actuating the equipment.

8. The equipment actuation system of claim 7 comprising apparatus responsive to a received rolling security code sequence for comparing a value derived from the received rolling security code sequence with both the fixed security code sequence and the value derived from a rolling security code sequence stored in the memory.

9. In an equipment actuation system, a method comprising:

receiving a fixed security code sequence during a learning mode, and storing the received fixed code sequence in a first security code memory location;

receiving a rolling code security sequence during a learning mode, and storing in a second security code memory location a value derived from the received rolling code security sequence;

activating equipment in response to the receipt of a fixed code sequence while in an operate mode;

activating the same equipment in response to the receipt of a rolling code sequence while in an operate mode;

receiving a fixed security code sequence while in the operate mode; and comparing the received fixed security code sequence with the fixed code sequence stored in the first security code memory location and with the value derived from a rolling code stored in the second security code memory location.

* * * * *